United States Patent Office 3,511,773
Patented May 12, 1970

3,511,773
PROCESS FOR PRODUCING LPG AND A HIGH OCTANE REFORMATE
George E. Addison, Mount Prospect, and Roy T. Mitsche, Island Lake, Ill., assignors to Universal Oil Products Company, Des Plaines, Ill., a corporation of Delaware
No Drawing. Continuation-in-part of application Ser. No. 517,853, Dec. 30, 1965. This application Apr. 29, 1968, Ser. No. 725,203
Int. Cl. C10g 35/08
U.S. Cl. 208—139  12 Claims

ABSTRACT OF THE DISCLOSURE

A catalytic process for producing LPG and a high octane reformate from a hydrocarbon charge stock boiling in the gasoline range is disclosed. Catalyst utilized comprises a platinum group component and a halogen component combined with a carrier material containing alumina and about 1 to about 10 wt. percent of a uniform distribution of finely divided crystalline aluminosilicate particles. Process comprises contacting the charge stock and hydrogen with the catalyst at conditions including: a pressure of 400 to 700 p.s.i.g., a temperature of 800 to 1050° F., a LHSV of 0.5 to 5.0 hr.$^{-1}$, and a $H_2$/HC mole ratio of 4:1 to 15:1.

CROSS-REFERENCES TO RELATED APPLICATIONS

This application is a continuation-in-part of our application Ser. No. 517,583, filed Dec. 30, 1965, now abandoned.

DISCLOSURE

The subject of the present invention is a novel selective process for the simultaneous production of LPG and a high octane reformate from a hydrocarbon charge stock boiling in the gasoline range. More particularly, the present invention is a catalytic process for the selective production of LPG and a high octane reformate from a gasoline charge stock which process utilizes a catalyst comprising a platinum group component and a halogen component combined with a carrier material containing alumina and about 1 to about 10 wt. percent of crystalline aluminosilicate particles for the purpose of enabling the selective cracking of paraffins to $C_3$ and $C_4$ hydrocarbons coupled with the acceleration of reactions leading to the formation of a high octane reformate while simultaneously holding in check the reactions leading to $C_1$ and $C_2$ hydrocarbons.

Liquefied petroleum gas (commonly called LPG) is a mixture of $C_3$ and $C_4$ hydrocarbons that finds a ready market in many areas of the world. It commonly is used for domestic heating and cooking purposes in many areas that do not have ready access to natural gas supplies. Similarly, it provides a convenient feed stock for many chemical manufacturing processes such as in the manufacture of plastics; synthetic fibers, carbon black, synthetic rubbers, etc. Other major uses include: as a fuel for busses, trucks, tractors, diesel-electric locomotives, tankers, barges, etc. In fact, because of its relatively clean burning characteristics it is anticipated that it will be used even more widely in the future as a fuel.

In the face of the expanding demand for LPG, the art has quite naturally sought for improved methods of making it from higher boiling hydrocarbon feed stocks. One point of attack on this LPG production problem has involved attempts to modify a conventional gasoline-reforming process in order to increase the production of LPG therefrom. Heretofore, these attempts at modifying a conventional gasoline reforming process have not met with any large measure of commercial success because of the fact that with conventional platinum metal-containing reforming catalysts the selection of a severity level (i.e. higher pressures and temperatures) that favors the production of LPG has several significant adverse effects: namely, the production of $C_1$ and $C_2$ hydrocarbons is similarly increased, hydrogen production is difficult to sustain, the rate of deposition of hydrocarbonaceous deposits on the catalyst increases with corresponding decrease in the life of the catalyst before regeneration becomes necessary, and the process becomes difficult to control. In other words, operating an ordinary gasoline reforming system to produce substantial quantities of LPG requires severity levels that substantially degrade the over-all stability of the process and disproportionately effect the $C_5+$ vol. percent yield. These results are not altogether unexpected in light of the fact that reforming processes are generally designed to maximize $C_5+$ vol. percent yield at octane.

Accordingly, the problem addressed by the present invention involves the modification of a conventional reforming process so that it can make substantial quantities of LPG and a high octane reformate without incurring the substantial detriments outlined above, particularly, the increase in $C_1+C_2$ production. We have now found a process that provides a solution to this problem, and its key feature involves the use of a catalyst comprising a platinum group component and a halogen component combined with a carrier material containing alumina and finely divided crystalline aluminosilicate particles.

In one embodiment, accordingly, the present invention provides a process for selectively producing LPG and a high octane reformate from a hydrocarbon charge stock boiling in the gasoline range. This process comprises contacting the charge stock and hydrogen with a catalyst comprising a platinum group component and a halogen component combined with a carrier material containing about 1 to about 10 wt. percent of a uniform distribution of finely divided crystalline aluminosilicate particles. The conditions utilized in this process are a pressure of about 400 to about 700 p.s.i.g., a temperature of about 800° F. to 1050° F., a LHSV of about 0.5 to about 5.0 hr.$^{-1}$ and a hydrogen to hydrocarbon mole ratio of about 4:1 to 15:1.

Another embodiment is a process as outlined above wherein the crystalline aluminosilicate is in the hydrogen form and the platinum group metallic component is platinum or a compound of platinum.

A preferred embodiment relates to the process first outlined above wherein the carrier material is formed from an aluminum hydroxyl chloride sol by evenly distributing finely divided mordenite particles throughout the sol, gelling the resulting mixture to produce hydrogel particles and calcining the resulting hydrogel particles to obtain the carrier material.

Other objects and embodiment of the present invention relates to the details regarding essential catalytic components, concentration of components in the catalyst, methods of catalyst preparation, operating conditions for use in the processes, and the like particulars which are hereinafter given in the following detailed discussion of each of these facets of the present invention.

As indicated above, the catalyst used in the present invention comprises a carrier material containing alumina and a crystalline aluminosilicate having combined therewith a platinum group component, and a halogen component. Considering first the alumina material utilized in the present invention, it is preferred that the alumina material be porous, adsorptive, high surface area support having a surface area of about 25 to about 500 or more m.$^2$/gm. Suitable alumina materials are the crystalline aluminas known as gamma-, eta-, and theta-alumina, with gamma-alumina giving best results. In addition, in some embodiments the alumina material may contain minor proportions of other well-known refractory inganic oxides such as silica, zirconia, magnesia, etc. However, the preferred alumina is substantially pure gamma-alumina. In fact, an especially preferred alumina material has an apparent bulk density of about 0.30 gm./cc. to about 0.70 gm./cc. and surface area characteristics such as the average pore diameter is about 20 to about 300 angstroms, the pore volume is about 0.10 to about 1.0 ml./gm., and the surface area is about 100 to about 500 m.²/gm.

It is an essential feature of the present invention that the alumina carrier material contains finely divided crystalline aluminosilicate particles. As is well-known to those skilled in the art, crystalline aluminosilicates (also known as "zeolites" and "molecular sieves") are composed of a three-dimensional interconnecting network structure of silica and alumina tetrahedra. The tetrahedra are formed by four oxygen atoms surrounding a silicon or aluminum atom, and the basic linkage between the tetrahedra are through the oxygen atoms. These tetrahedra are arranged in an ordered structure to form interconnecting cavities or channels of uniform size interconnected by uniform openings or pores. The ion-exchange property of these materials follows from the trivalent nature of aluminum which causes the alumina tetrahedra to be negatively charged to and allows the association with them of cations in order to maintain electrical balance in the structure. The molecular sieve property of these materials follows from the uniform size of the pores thereof which can be correlated to the size of the molecules and used to remove from a mixture of molecules, the molecules having a critical diameter less than or equal to the diameter of the pore mouths of these crystalline aluminosilicates. For purposes of the present invention, it is preferred to use crystalline aluminosilicates having pore mouths of at least 5 Angstroms in cross-sectional diameter, and more preferably about 5 to about 15 Angstrom units. Ordinarily, the aluminosilicates are synthetically prepared in the alkali metal form with one alkali metal cation associated with each aluminum centered tetrahedra. This alkali metal cation may be thereafter ion-exchanged with polyvalent cations such as calcium, magnesium, beryllium, rare earth cations, etc. Another treatment of these alkali metal aluminosilicates involves ion-exchange with ammonium ions followed by thermal treatment, preferably above 300° F. to convert to the hydrogen form. When the crystalline aluminosilicate contains a high mole ratio of silica to alumina (for example, above 5) the material may be directly converted to an acid form in a suitable acid medium.

Although in some cases the polyvalent form of the aluminosilicate may be used in the present invention, it is preferred to use the hydrogen form or a form such as the alkali metal form, which is convertable to the hydrogen form during the course of the preferred incorporation procedure discussed below.

The preferred crystalline aluminosilicate for use in the present invention are the hydrogen and/or polyvalent forms of synthetically prepared faujasite and mordenite. In fact, we have found best results with synthetic mordenite having an effective pore diameter of about 4 to about 6.6 Angstrom units and a mole ratio of silica to alumina of about 9 to 11. As is well-known to those skilled in the art, mordenite differs from other known crystalline aluminosilicates in that its crystal structure is believed to be made up of chains of 5-member rings of tetrahedra which apparently are arranged to form a parallel system of channels having diameters of about 4 to 6.6 Angstroms interconnected by smaller channels having a diameter of about 2.8 Angstroms. Mordenite is characterized by the following formula:

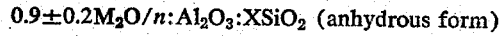

$$0.9 \pm 0.2 M_2O/n : Al_2O_3 : XSiO_2 \text{ (anhydrous form)}$$

where M is a cation which balances the electrovalences of the tetrahedra, n is the valence of M, and X is a constant generally ranging in value from 9 to 11 and usually about 10. These synthetic mordenite type zeolites are available from a number of sources, one being the Norton Company of Worchester, Mass.

Regarding the method of incorporating the crystalline aluminosilicate particles into the alumina carrier material, we have found that best results were obtained by adding the crystalline aluminosilicate particles directly to an aluminum hydroxyl chloride sol prior to its formation in the alumina carrier material. An advantage of this method is the relative ease with which the crystalline aluminosilicate particles can be uniformly distributed in the resulting carrier material. Additionally, the sol appears to react with the crystalline aluminosilicate, causing some basic modification of its structure which enables the resulting carrier material to have unusual ability to catalyze reactions which depend on carbonium ion intermediates such as cracking, alkylation, isomerization, polymerization, etc., and particularly, hydrocracking to $C_3$ and $C_4$ fragments.

Accordingly, the preferred method for preparing the carrier material involves the following steps: forming an aluminum hydroxyl chloride sol by digesting aluminum metal in HCl to result in a sol having a weight ratio of aluminum to chloride of about 1:1 to about 1.4:1; evenly distributing the crystalline aluminosilicate particles throughout the sol; gelling the resultant mixture to produce a hydrogel or particles of a hydrogel; then finishing the hydrogel into the carrier material by standard aging, washing, drying and calcination treatments. For purposes of the present invention, the carrier material may be formed in any desired shape such as spheres, pellets, pills, cakes, extrudates, powders, granules, etc. However, a particularly preferred form of the carrier material is the sphere; and spheres may be continuously manufactured by the well-known oil drop method which comprises forming an alumina hydrosol, preferably by reacting aluminum metal with hydrochloric acid, evenly distributing the crystalline aluminosilicate particles throughout the hydrosol, combining the hydrosol with a suitable gelling agent such as hexamethylenetetraamine, and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogen to the corresponding crystalline gamma-alumina. See U.S. Pat. No. 2,620,314 for additional details regarding this oil drop method.

The amount of crystalline aluminosilicate in the resulting alumina carrier material is preferably about 1.0 to about 10 wt. percent thereof, and, particularly, when using mordenite about 2.0 to about 7.0 wt. percent. By the expression "finely divided" it is meant that the crystalline aluminosilicate is used in a particle size having an average diameter of about 1 to about 100 microns, with best results obtained with particles of average diameter of less than 40 microns.

One essential component of the catalyst used in the present invention is the halogen component. Although the precise form of the chemistry of the association of the halogen component with the aluminum support is not entirely known, it is customary in the art to refer to the halogen component as being combined with the alumina support, or with the other ingredients of the catalyst. This combined halogen may be either fluorine, chlorine, iodine, bromine, or mixtures thereof. Of these, fluorine and particularly, chlorine are preferred for the purposes of the present invention. The halogen may be added to the carrier material in any suitable manner, either during its preparation or before, during or after the addition of the platinum component thereto. For example, the halogen may be added, at any stage of the preparation of the carrier or to the calcined carrier material, as an equeous solution of an acid such as hydrogen fluoride, hydrogen chloride, hydrogen bromide, etc. The halogen component, or a portion thereof, may be composited with a carrier during the impregnation of the latter with the platinum group component; for example, through the utilization of a mixture of chloroplatinic acid and hydrogen chloride. In a preferred situation, the alumina hydrosol which is utilized to form the alumina carrier material contains halogen and thus contributes a significant portion of the halogen component to the final composite. In any event, the halogen will be typically composited with the alumina carrier material in such a maner as to result in a final catalyst which contains about 0.5 to about 1.5% and preferably about 0.7 to about 0.9% by weight of halogen calculated on an elemental basis.

A second essential component of the catalyst is the platinum group component. Although the process of the present invention is specifically directed to the use of a catalytic composite containing platinum, it is intended to include other platinum group metals such as palladium, rhodium, ruthenium, etc. The platinum group component, such as platinum, may exist within the final catalytic composite as a compound such as an oxide, sulfide, halide, etc., or as an elemental state. Generally, the amount of the platinum group component present in the final catalyst is small compared to the quantities of the other components combined therewith. In fact, the platinum group component generally comprises about 0.05 to about 1.5 by weight of the final catalytic composite calculated on an elemental basis. Excellent results are obtained when the catalyst contains about 0.3 to about 0.9 weight percent of the platinum group metal.

The platinum group component may be incorporated in the catalytic composite in any suitable manner such as coprecipitation or cogellation with the alumina material, ion-exchange with the carrier material and/or alumina hydrogel, or impregnation either after or before calcination of the carrier material, etc. The preferred method of preparing the catalyst involves the utilization of water soluble compounds of the platinum group metals to impregnate the carrier material. Thus, the platinum group metal may be added to the support by commingling the latter with an aqueous solution of chloroplatinic acid. Other water-soluble compounds of platinum may be employed as impregnation solutions and include ammonium chloroplatinate, platinum chloride, dinitro diamino platinum, etc. The utilization of a platinum chloride compound, such as chloroplatinic acid, is preferred since it facilitates the incorporation of both the platinum component and at least a minor quantity of the halogen component in a single step. Hydrogen chloride is also generally added to the impregnation solution in order to further facilitate the incorporation of the halogen component. In addition, it is generally preferred to impregnate the support after it has been calcined in order to minimize the risk of washing away the valuable platinum metal compounds; however, in some cases it may be advantageous to impregnate the support when it is in a gelled state.

Regardless of the details of how the components of the catalyst are combined with the carrier material, the final catalyst generally will be dried at a temperature of from about 200° F. to about 600° F. for a period of from about 2 to 24 hours or more and finally calcined at a temperature of about 700° F. to about 1100° F. for a period of about 0.5 to about 10 hours, and preferably about 1 to about 5 hours.

It is preferred that the resultant calcined catalytic composite be subjected to reduction conditions prior to its use in the conversion of hydrocarbons. This step is designed to insure a uniform and finely divided dispersion of the metallic component throughout the carrier material. Preferably, substantially pure and dry hydrogen is used as the reducing agent in this step. The reducing agent is contacted with the calcined catalyst at a temperature of about 800° F. to about 1200° F. and for a period of time of about 0.5 to 10 hours or more effective to substantially reduce platinum group component to its elemental state. This reduction treatment may be performed in situ as part of a start-up sequence if desired.

Although it is not essential, the resulting reduced catalytic composite is preferably subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally including a temperature ranging from about 50° F. up to about 1100° F. or more.

According to the present invention, a hydrocarbon charge stock boiling in the gasoline range and hydrogen are contacted with a catalyst of the type described above in a hydrocarbon conversion zone at LPG production conditions. This contacting step may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

The hydrocarbon charge stock that is charged to this contacting step is a hydrocarbon fraction containing naphthenes and paraffins that boil within the gasoline range. The preferred charge stocks are those consisting essentially of naphthenes and paraffins, although in some cases aromatics and/or olefins may also be present. In fact, an especially preferred charge stock is a Middle East Paraffinic-Type naphtha. This preferred class includes straight run gasolines, natural gasolines, synthetic gasolines and the like. On the other hand, it is frequently advantageous to charge thermally or catalytically cracked gasolines or higher boiling fractions thereof, called heavy naphthas. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_6$ to 425° F. In some cases, it may also be advantageous to charge pure hydrocarbons or mixtures of hydrocarbons that have been extracted m hydrocarbon distillates—for example, straight-chain
raffins.
Following the contacting step, an effluent stream is
hdrawn from the conversion zone and passed through
ondensing means to a separation zone, typically maintained at about 50° F. wherein a hydrogen-rich gas is arated from a liquid product. Preferably, at least a rtion of this hydrogen-rich gas is withdrawn from the arating zone and recycled through suitable compressmeans back to the contacting step. The liquid phase m the separating zone is then typically withdrawn and nmonly treated in a fractionating system in order to over $C_1+C_2$, LPG, and a $C_5+$ high octane reformate. The LPG-production conditions used in the contacting p are selected from the following ranges as a function the characteristic of the charge stock being converted f of the exact composition of the catalyst being used, order to maximize the yield of LPG while simultaously producing a high octane $C_5+$ reformate. The conons are: a pressure of about 400 to about 700 p.s.i.g.; emperature of about 800 to about 1050° F, a liquid irly space velocity (LHSV) of about 0.5 to about 5.0 $^{-1}$ and a hydrogen to hydrocarbon mole ratio of about to about 15:1. A preferred procedure for accomhing this selection where the process is run with recle of a hydrogen stream recovered from the effluent m the conversion zone, involves adjusting the conons so that there is a slight net hydrogen make in system, thereby providing enough hydrogen from the lrogen-producing reaction associated with the produc-1 of the high octane reformate to supply the hydrogen isumed in the selective hydrocracking to LPG reaction. reover, the principal variable that is adjusted to ieve this hydrogen balance state is pressure since the lrocracking function of the catalyst is extremely sensi-) to pressure variations: that is the selective hydrocking to LPG function of the catalyst responds directo increases in pressure.

At this point, it is to be emphasized that the outstanding ture of the process discussed herein is the ability to duce LPG and a high octane reformate in a selective hion, and this selectivity feature is conveniently meas-d by examining the total light gas make and LPG ke for the process of the present invention relative to t experienced with conventional continuous reforming tems at equivalent conditions. This comparison is wn in the following examples.

The following examples are presented to further illus-e the novelty, utility and mode of operation of the cess of the present invention. They are intended to be strative, and are not to be construed to unduly limit scope of the process of the present invention.

Example I

Aluminum metal, having a purity of 99.99 wt. percent ligested in hydrochloric acid to produce an aluminum roxyl chloride sol having a weight ratio of Al/Cl of ut 1.15 and a specific gravity of 1.3450. An aqueous ition containing 28 wt. percent HMT (i.e. hexamethretetramine) is made up and 700 cc. of the HMT ition is then added to 700 cc. of the sol to form a pping solution. About 10 grams of the hydrogen form mordenite in the form of fine particles is added to the ilting dropping solution and uniformly distributed rein. Another portion of the mordenite is chemically lyzed and contains 11.6 wt. percent $Al_2O_3$, 87.7 wt. cent $SiO_2$ and 0.2 wt. percent Na. Still another portion the mordenite is analyzed for particle size distribution. : results show that 57.6 wt. percent of the powder is ween 0 to 40 microns in size and 82.1 wt. percent of powder is between 0 and 60 microns in size.

The dropping solution containing the dispersed morite is passed through a vibrating dropping head and pped in discrete particles into a forming oil mainned at 95° C. The rate of vibration and the volumetric w of dropping solution is set to produce finished spher-ical particles of about 1/16 of an inch in diameter. The dropped particles are aged in oil overnight (about 16 hours), separated from the oil and aged in an ammoniacal solution at 95° C. for about 3 hours. The aged spherical particles are then water washed to remove neutralization salts and dried. The particles are thereupon calcined at 600° C. for 4 hours in dry air to give a catalyst support having an apparent bulk density of about 0.52 gm./cc., a surface area of about 200 m.²/gm., a pore volume of 0.54 ml./gm., and an average pore diameter of about 105 Angstroms.

About 350 cc. of the catalyst support is placed in a steam jacketed rotating vessel and 250 cc. of an impregnation solution containing chloroplatinic acid, and hydrochloric acid is added thereto. The vessel is rotated until all the liquid solution is evaporated. The catalyst particles are then oxidized at a temperature of about 1025° F. to produce a finished catalyst containing, on an elemental basis, 0.75 wt. percent platinum and about 0.87 wt. percent chloride.

The resulting catalytic composite is thereafter reduced with a substantially pure hydrogen stream at a temperature of about 1020° F., a gas hourly space velocity of about 700 hr.$^{-1}$ and a pressure slightly above atmospheric for a period of about 1 hour. A gaseous mixture of $H_2S$ and $H_2$ is then utilized to incorporate sulfur in the resulting reduced composite. The gaseous mixture contains about 10 moles of $H_2$ per mole of $H_2S$, and is contacted with the catalyst at essentially the same conditions are those given above for the reduction step resulting in the incorporation of about 0.10 wt. percent sulfur in the catalyst.

An analysis of the resulting catalytic composite shows it to contain 0.75 wt. percent platinum, 0.87 wt. percent chloride, 0.01 wt. percent sulfur, and about 4.4 wt. percent $SiO_2$.

Example II

This example demonstrates the capability of the catalyst of Example I to produce extraordinary quantities of LPG.

A portion of the catalyst prepared in Example I is designated as Catalyst A.

Another catalyst is manufactured in essentially the same manner as outlined in Example I except that no crystalline aluminosilicate is added to the carrier material. The resulting catalyst is designated as Catalyst B and is found to contain 0.75 wt. percent platinum, 0.85 wt. percent chloride and 0.10 wt. percent sulfur. It is representative of the high quality reforming catalyst of the prior art, and is used herein as the control.

Catalysts A and B are then separately subjected to a high evaluation test which consists of charging a heavy naphtha having the properties shown in Table I to a continuous reforming plant containing the catalyst as a fixed bed at conditions including a LHSV of 2.0 hr.$^{-1}$, a hydrogen to hydrocarbon mole ratio of 12:1, a pressure of 500 p.s.i.g., a temperature of 959° F., and for a period of 14 hours.

TABLE I.—PROPERTIES OF HEAVY NAPHTHA

| | |
|---|---|
| API gravity at 60° F. | 60.3 |
| ASTM Distillation D86: | |
| I.B.P., °F. | 250 |
| 10%, °F. | 265 |
| 50%, °F. | 285 |
| 90%, °F. | 336 |
| E.B.P., °F. | 395 |
| Sulfur, p.p.m. | 113 |
| Oxygen, p.p.m. | 100 |
| Aromatics, vol. percent | 1 |
| Naphthenes, vol. percent | 13 |
| Paraffins, vol. percent | 86 |

The results of these comparison tests are shown in Table II in terms of average product distribution over the 14 hour test period.

TABLE II—RESULTS OF COMPARISON TESTS

| | Catalyst A | Catalyst B | Increment |
|---|---|---|---|
| Octane No., F-1 clear | 96.9 | 96.9 | 0 |
| Excess recycle gas, s.c.f.b | 146.9 | 955 | −808 |
| Mol percent $H_2$ in recycle gas | 56.4 | 73.6 | −17.2 |
| Product distribution: | | | |
| $H_2$, wt. percent of feed | .23 | 1.61 | −1.31 |
| $C_1$, wt. percent of feed | 1.86 | 2.61 | −.75 |
| $C_2$, wt. percent of feed | 4.95 | 4.87 | +.08 |
| $C_3$, wt. percent of feed | 16.82 | 9.26 | +7.56 |
| $C_4$, wt. percent of feed | 22.96 | 11.50 | +11.46 |
| $C_5+$, wt. percent of feed | 55.06 | 71.58 | −16.52 |

From Table II, the effect of the catalyst of Example I on the performance of the reforming process is immediately evident. It results in a dramatic shift in the light gas make toward $C_3+C_4$ production (LPG) with no corresponding increase in $C_1+C_2$ make. More particularly, the selectivity for LPG for Catalyst A is 39.78 wt. percent of the charge stock whereas for Catalyst B the selectivity for LPG is 20.76 wt. percent of the charge. Accordingly, the process of the present invention enables the LPG yield to be sharply increased with no corresponding increase in undesired $C_1+C_2$ make.

Example III

A series of runs are made with a number of catalysts that are manufactured according to the method delineated in Example I except the chloride level in the finished catalyst is varied from .13 wt. percent to 1.0 wt. percent.

The runs consist of charging a light Kuwait naphtha having an I.B.P. of 180° F., a 50% point of 214° F., an end boiling point of 304, and a gravity of 64.9° API at 60° F., to a laboratory scale reforming plant containing a fixed bed of the various reforming catalysts at conditions which include a plant pressure of 600 p.s.i.g., a LHSV of 1.5 hr.$^{-1}$, a mole ratio of hydrogen to hydrocarbon of 8:1, and a temperature sufficient to produce about 0.10 standard cubic feet of excess hydrogen recycle gas per hour, or if you will, a temperature sufficient to maintain plant pressure with internally produced hydrogen.

It is found that a catalyst chloride content of at least 0.5 wet. percent is necessary to sustain plant pressure and maintain the temperature at levels which avoid excessive production of $C_1$ and $C_2$, thereby retaining the high selectivity for LPG feature of the process of the present invention.

Example IV

A long-term comparison test is made between the process of the present invention and an ordinary reforming process operated at process conditions designed to promote LPG production.

The charge stock utilized is a Kuwait naphtha having a gravity of 62.0° API at 60° F., an I.B.P. of 172° F., a 50% B.P. of 240° F., an E.B.P. of 362° F., an F-1 clear octane number of 42.0, a paraffin content of 75 vol. percent, a naphthene content of 16 vol. percent, and an aromatic content of 9 vol. percent.

The catalyst utilized in the first part of the test is designated as Catalyst C and is prepared by the method given in Example I and found to contain 0.76 wt. percent chlorine, 0.11 wt. percent sulfur, and 0.76 wt. percent platinum combined with a carrier material containing gamma-alumina and 4.5 wt. percent mordenite.

The catalyst utilized for control purposes is designated a Catalyst D and is manufactured essentially by the method delineated in Example I except no mordenite is added to the alumina carrier material. Analysis shows it to contain 0.8 wt. percent chlorine, 0.10 wt. percent sulfur, and 0.75 wt. percent platinum combined with a substantially pure gamma-alumina carrier material.

Conditions utilized in both runs are a LHSV of 2.0 hr.$^{-1}$, a pressure of 600 p.s.i.g., a hydrogen to hydrocarbon mole ratio of 5:1, and a temperature sufficient to produce a $C_5+$ reformate having an F-1 clear octane number of 95.0. Both tests are run to a catalyst life of about 8 barrels of charge per pound of catalyst.

Average yield data for these runs are present in Table III.

TABLE III.—RESULTS OF LONG TERM COMPARISON TEST

| | Catalyst C | Catalyst D |
|---|---|---|
| $H_2$ yield, s.c.f.b | 200 | 350 |
| $C_1+C_2$, wt. percent | 8.3 | 8.9 |
| $C_3+C_4$, wt. percent | 27.5 | 16.3 |
| $C_5+$, wt. percent | 63.9 | 74.1 |

From these results, it is evident that the process of the present invention (i.e. Catalyst C) produced LPG at a selectivity based on feed of 27.5 wt. percent which stands in sharp contrast to the 16.3 wt. percent selectivity observed for an ordinary reforming process at the same conditions. Moreover, Catalyst C exhibited an acceptable average temperature stability of about 4° F./B.P.P. over the duration of the test.

Example V

A series of runs are made with an ordinary reforming catalyst essentially having the composition of Catalyst D of Example IV. These runs are designed to study the response of this catalyst to severity levels that increase LPG production.

The charge stock used in the run is the same as in Example IV.

The conditions that are varied are essentially temperature and pressure. It is found that the catalyst responds to a 35° F. increment in temperature by changing the product yield structure by the following increments: a $\Delta C_1+C_2$ of 3.6 wt. percent, a $\Delta C_3+C_4$ of 3.7, and a $\Delta C_5+$ of −7.1. Thus it is seen that an ordinary reforming catalyst responds to temperature increase by increasing both the $C_1+C_2$ make and the $C_3+C_4$ make in approximately the same proportion. This response is indicative of the poor selectivity for LPG which is exhibited by these catalysts.

Similarly, a 200 p.s.i.g., increment in pressure produces the following changes in yield structure: a $\Delta C_1+C_2$ of 2.1 wt. percent, a $\Delta C_3+C_4$ of 2.2 wt. percent, and a $\Delta C_5+$ of −3.6 wt. percent. Here again the response of the ordinary reforming catalyst is to increase both $C_1+C_2$ and $C_3+C_4$ make in about the same proportion.

In sharp contrast, a catalyst which is identical to Catalyst C above responds to temperature and pressure variations by maintaining a high selectivity for LPG and such that a change in conditions as above produces about 4 times more LPG than $C_1+C_2$. Thus, the LPG-making feature of the present invention is manifest.

We claim as our invention:

1. A process for selectively producing LPG and a high octane reformate from a hydrocarbon charge stock boiling in the gasoline range, said process comprising contacting the charge stock and hydrogen with a catalyst consisting essentially of a platinum group component and a halogen component combined with an alumina carrier material containing about 2.0 to about 7.0 wt. percent of a uniform distribution of finely divided mordenite particles, said catalyst optionally including a sulfur component, at conditions including a pressure of about 400 to 700 p.s.i.g., a temperature of about 800° F. to about 1050° F., a LHSV of about 0.5 to about 5.0 hr.$^{-1}$ and a hydrogen to hydrocarbon mole ratio of about 4:1 to about 15:1, effective to produce LPG and a high octane reformate, said catalyst having been prepared by evenly distributing finely divided mordenite particles throughout an aluminum hydroxyl chloride sol, gelling the resulting mixture to produce hydrogel particles and calcining the gelled particles, and thereafter compositing said platinum group component with the calcined particles.

2. The process of claim 1 wherein said platinum group component is platinum or a compound of platinum.

3. The process of claim 1 wherein said mordenite is the hydrogen form.

4. The process of claim 1 wherein the halogen component is chlorine or fluorine.

5. The process of claim 1 wherein said alumina is gamma-alumina.

6. The process of claim 1 wherein said aluminum hydroxyl chloride sol possesses an aluminum to chloride weight ratio of about 1:1 to about 1.4:1.

7. The process of claim 1 wherein said catalyst contains about 0.05 to about 1.5 wt. percent of the platinum group metal.

8. The process of claim 1 wherein said catalyst contains about 0.5 to about 1.5 wt. percent of the halogen.

9. The process of claim 1 wherein the mordenite particles have an average diameter of about 1 to 100 microns.

10. The process of claim 1 wherein the hydrocarbon charge stock is a naphtha boiling in the range of about 20 to about 425° F.

11. The process of claim 1 wherein the hydrocarbon charge stock is a Middle East paraffinic-type naphtha.

12. The process of claim 1 wherein a sulfur component is combined with the catalyst in an amount sufficient to result in the catalyst containing about .05 to about 0.5 wt. percent sulfur.

References Cited
UNITED STATES PATENTS

| | | | |
|---|---|---|---|
| 3,140,253 | 7/1964 | Plank et al. | 208—120 |
| 3,198,728 | 8/1965 | Evans | 208—65 |
| 3,236,762 | 2/1966 | Rabo et al. | 208—111 |
| 3,236,903 | 2/1966 | Milton | 260—666 |
| 3,247,099 | 4/1966 | Oleck et al. | 208—138 |
| 3,298,780 | 1/1967 | Fleck | 23—113 |
| 3,301,917 | 1/1967 | Wise | 260—683.65 |
| 3,376,214 | 4/1968 | Bertolacini et al. | 208—138 |
| 3,376,215 | 4/1968 | Bertolacini et al. | 208—138 |

HERBERT LEVINE, Primary Examiner

U.S. Cl. X.R.
208—138; 252—455